United States Patent
Kundu et al.

(10) Patent No.: US 9,919,704 B1
(45) Date of Patent: Mar. 20, 2018

(54) PARKING FOR SELF-DRIVING CAR

(71) Applicant: International Business Machines Corporation, Armonk, NY (US)

(72) Inventors: Ashish Kundu, Elmsford, NY (US); Clifford A. Pickover, Yorktown Heights, NY (US); Maja Vukovic, New York, NY (US); Komminist Weldemariam, Nairobi (KE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/418,107

(22) Filed: Jan. 27, 2017

(51) Int. Cl.
*B60W 30/06* (2006.01)
*B60W 40/08* (2012.01)
(Continued)

(52) U.S. Cl.
CPC ............ *B60W 30/06* (2013.01); *B60J 5/0493* (2013.01); *B60W 40/08* (2013.01); *B60W 50/14* (2013.01); *B60W 50/16* (2013.01); *B62D 15/0285* (2013.01); *G06K 9/00812* (2013.01); *G06K 9/00845* (2013.01); *G06K 9/6256* (2013.01); *G06K 9/78* (2013.01); *H04N 13/0242* (2013.01); *H04N 13/0257* (2013.01);
(Continued)

(58) Field of Classification Search
CPC ...... B60W 30/06; B60W 40/08; B60W 50/16; B60W 2550/14; B60W 50/14; B60W 2040/0872; B60W 2040/0809; B60W 2050/143; B60W 2050/146; B60W 2550/10; B62D 15/0285; B60J 5/0493; G06K 9/6256; G06K 9/00812; G06K 9/00845; G06K 9/78; H04N 13/0242; H04N 13/0257
See application file for complete search history.

(56) References Cited

U.S. PATENT DOCUMENTS 5,294,210 A   3/1994   Lemelson
8,321,067 B1  11/2012  Prada Gomez et al.
(Continued)

FOREIGN PATENT DOCUMENTS

CN     103822592 A    5/2014

OTHER PUBLICATIONS

Keiji Fujimura et al., Road Surface Sensor. Fujitsu Ten Tech J., No. 1(1988). pp. 64-72.
(Continued)

*Primary Examiner* — Russell Frejd
(74) *Attorney, Agent, or Firm* — Louis J. Percello; Otterstedt, Ellenbogen & Kammer, LLP (57) ABSTRACT

A self-driving car includes a vehicle body; wheels mounted on the vehicle body for moving the car; brakes mounted on the vehicle body for stopping the wheels; a steering apparatus connected between the vehicle body and at least some of the wheels for steering the wheels; sensors configured to detect environmental parameters; and a processor that is configured to facilitate at least an autonomous parking module for controlling the wheels, brakes, and steering apparatus. The processor is further configured as part of the autonomous parking module to scan the surroundings of the self-driving car, using at least one of the sensors, in order to detect a road hazard proximate a door of the self-driving car.

18 Claims, 9 Drawing Sheets

(51) Int. Cl.
*B60W 50/14* (2012.01)
*B60W 50/16* (2012.01)
*B62D 15/02* (2006.01)
*B60J 5/04* (2006.01)
*G06K 9/62* (2006.01)
*G06K 9/78* (2006.01)
*G06K 9/00* (2006.01)
*H04N 13/02* (2006.01)

(52) U.S. Cl.
CPC ............... *B60W 2040/0809* (2013.01); *B60W 2040/0872* (2013.01); *B60W 2050/143* (2013.01); *B60W 2050/146* (2013.01); *B60W 2550/10* (2013.01); *B60W 2550/14* (2013.01)

(56) References Cited

U.S. PATENT DOCUMENTS

| | | | | |
|---|---|---|---|---|
| 8,571,722 | B2 | 10/2013 | Samples et al. | |
| 8,872,640 | B2* | 10/2014 | Horseman | B60W 40/08 340/425.5 |
| 9,139,199 | B2 | 9/2015 | Harvey | |
| 9,196,048 | B2 | 11/2015 | Jahanshahi et al. | |
| 2009/0146813 | A1* | 6/2009 | Nuno | G08B 21/22 340/572.1 |
| 2014/0196529 | A1 | 7/2014 | Cronin et al. | |
| 2015/0127208 | A1* | 5/2015 | Jecker | B62D 15/025 701/23 |
| 2015/0241241 | A1 | 8/2015 | Cudak et al. | |
| 2015/0345965 | A1* | 12/2015 | Semsey | G07B 15/02 701/537 |
| 2016/0167581 | A1* | 6/2016 | Beck | H04N 7/183 348/148 |
| 2016/0321848 | A1* | 11/2016 | Ricci | G07C 9/00158 |

OTHER PUBLICATIONS

A. L. Rankin et al., Daytime Mud Detection for Unmanned Ground Vehicle Autonomous Navigation. Dec. 2008. https://www-robotics.jpl.nasa.gov/publications/Arturo_Rankin/asc2008-rankin-mud-detection-final.pdf. pp. 1-9.

D. Prevost et al., On-Board Estimation of Water Depth Using Low-Cost Sensors. 2012, 7th Symposium on Pavement Surface Characteristics, Norfolk, VA. pp. 1-14.

Peter Mell & Timothy Grance. The NIST Definition of Cloud Computing. Special Publication 800-145. Sep. 2011, pp. 1-7.

Ray Massey, "Jaguar Land Rover develop car that detects potholes and warns other drivers," The Daily Mail, Jun. 3, 2015, downloaded Jan. 27, 2017 from http://www.dailymail.co.uk/sciencetech/article-3117181/Jaguar-Land-Rover-develop-car-detects-potholes-warns-drivers.html, pp. 1-8.

* cited by examiner

PARKING FOR SELF-DRIVING CAR

BACKGROUND

The present disclosure relates to self-driving cars ("SDCs").

Self-driving cars are a rapidly developing field of technology. One aspect of SDC technology is the ability for a SDC to autonomously park itself. Typically, SDC parking modules use radar and/or cameras to detect and adjust for hard barriers that the car might impact—e.g., other cars, light posts, high curbs, and the like. Typically, SDC parking modules do not account for surface road hazards such as potholes, ice, mud, snow, or puddles. On non-asphalt or non-concrete roads, the probabilities of puddles, mud, or hidden holes are very high. Dangerous animals, such as snakes or wild dogs, also can be present. Accordingly it is possible for a passenger to disembark from an autonomously parked SDC directly into a road hazard. This is not only inconvenient for the passenger, it also may be dangerous.

SUMMARY

Embodiments of the present invention implement methods for ameliorating road hazards during an autonomous parking module of a self-driving car.

Embodiments of the present invention provide a self-driving car that ameliorates road hazards during execution of its autonomous parking module.

In one aspect, an exemplary method for parking a self-driving car is provided that includes facilitating an autonomous parking module of the self-driving car; and, facilitating a road hazard identification module that scans the surroundings of the self-driving car, using at least one sensor of the self-driving car, to identify a road hazard proximate a door of the self-driving car.

In another aspect, an exemplary self-driving car includes a vehicle body; wheels mounted on the vehicle body for moving the car; brakes mounted on the vehicle body for stopping the wheels; a steering apparatus connected between the vehicle body and at least some of the wheels for steering the wheels; sensors configured to detect environmental parameters; and a processor that is configured to facilitate at least an autonomous parking module for controlling the wheels, brakes, and steering apparatus. The processor is further configured as part of the autonomous parking module to scan the surroundings of the self-driving car, using at least one of the sensors, in order to detect a road hazard proximate a door of the self-driving car.

In another aspect, a non-transitory computer readable medium comprises computer executable instructions which when executed by a computer cause the computer to facilitate the method of: facilitating an autonomous parking module of a self-driving car; and facilitating a road hazard identification module that scans the surroundings of the self-driving car, using at least one sensor of the self-driving car, to identify a road hazard proximate a door of the self-driving car.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

Enhanced road hazard detection where visibility is poor, by using non-visible wavelengths for identifying road hazards near a parking spot or point of disembarkation.

Enhanced road hazard avoidance, by adjusting an autonomous parking module to offset a vehicle door from a road hazard.

Amelioration of road hazards during autonomous vehicle parking, either by adjusting the autonomous parking module, by warning a vehicle occupant, or by bridging over the road hazard.

Enhanced passenger safety, security and health by prioritizing or adjusting parking modules in real-time based externally observed or detected hazard conditions.

BRIEF DESCRIPTION OF THE DRAWINGS

These and other features, aspects, and advantages of the present invention will become better understood with regard to the following description, appended claims, and accompanying drawings where:

DETAILED DESCRIPTION

The subject matter of the instant application will be described with reference to illustrative embodiments. For this reason, numerous modifications can be made to these embodiments and the results will still come within the scope of the invention. No limitations with respect to the specific embodiments described herein are intended or should be inferred.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
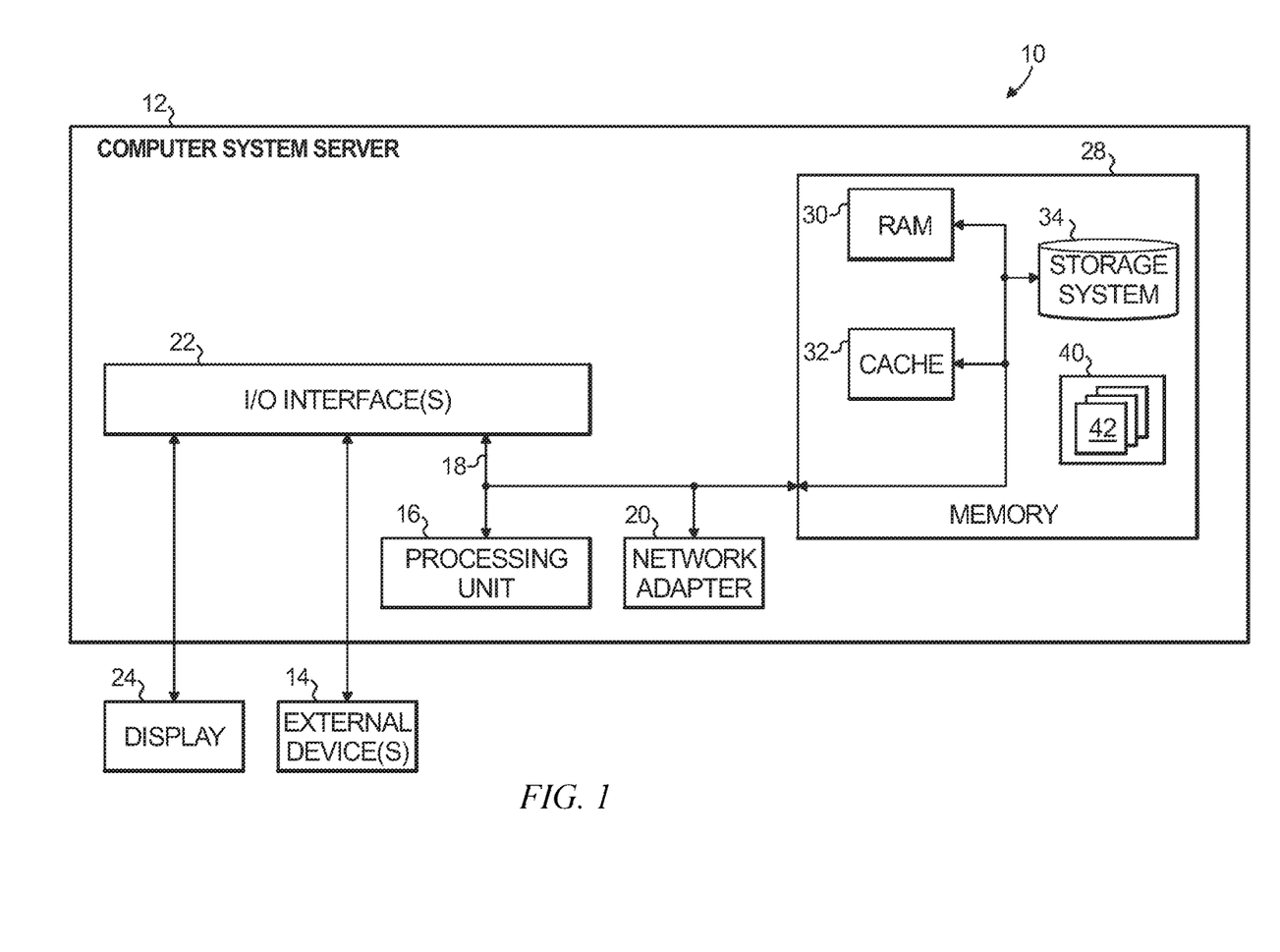
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein. As one example, the cloud computing node 10 may be implemented onboard a self-driving car as further discussed below.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a voice recognition module, a steering wheel, a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
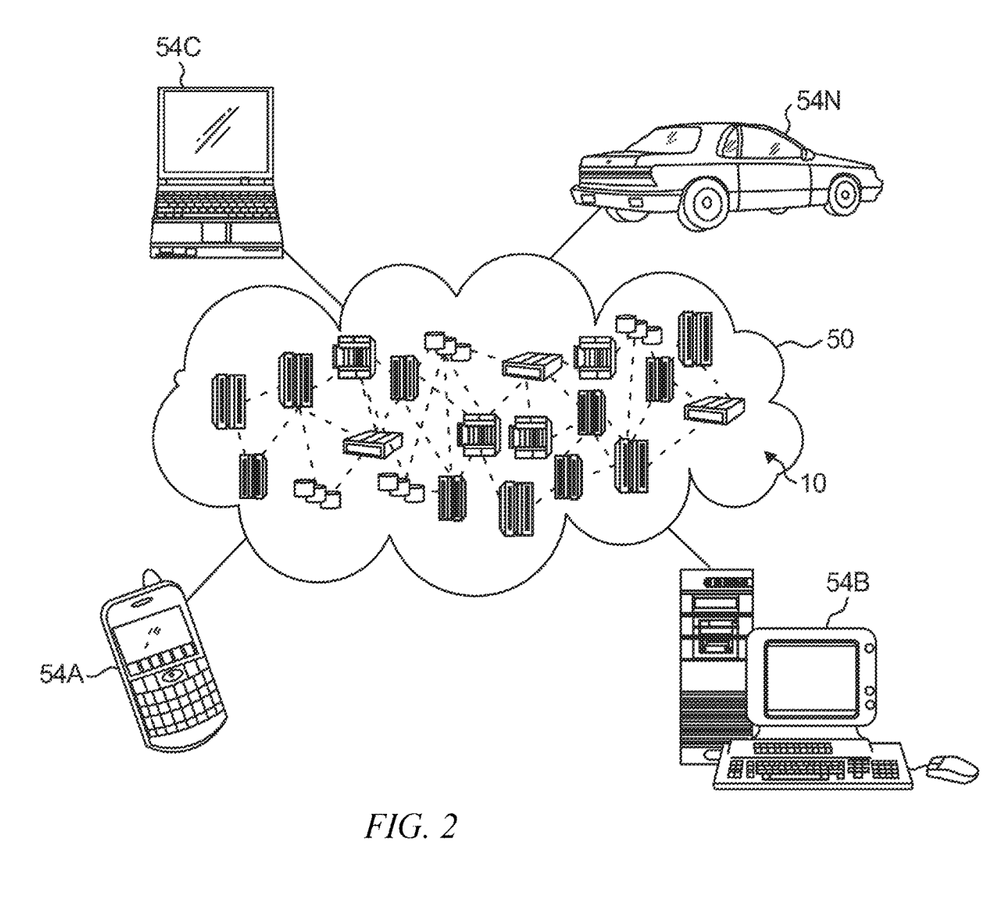
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
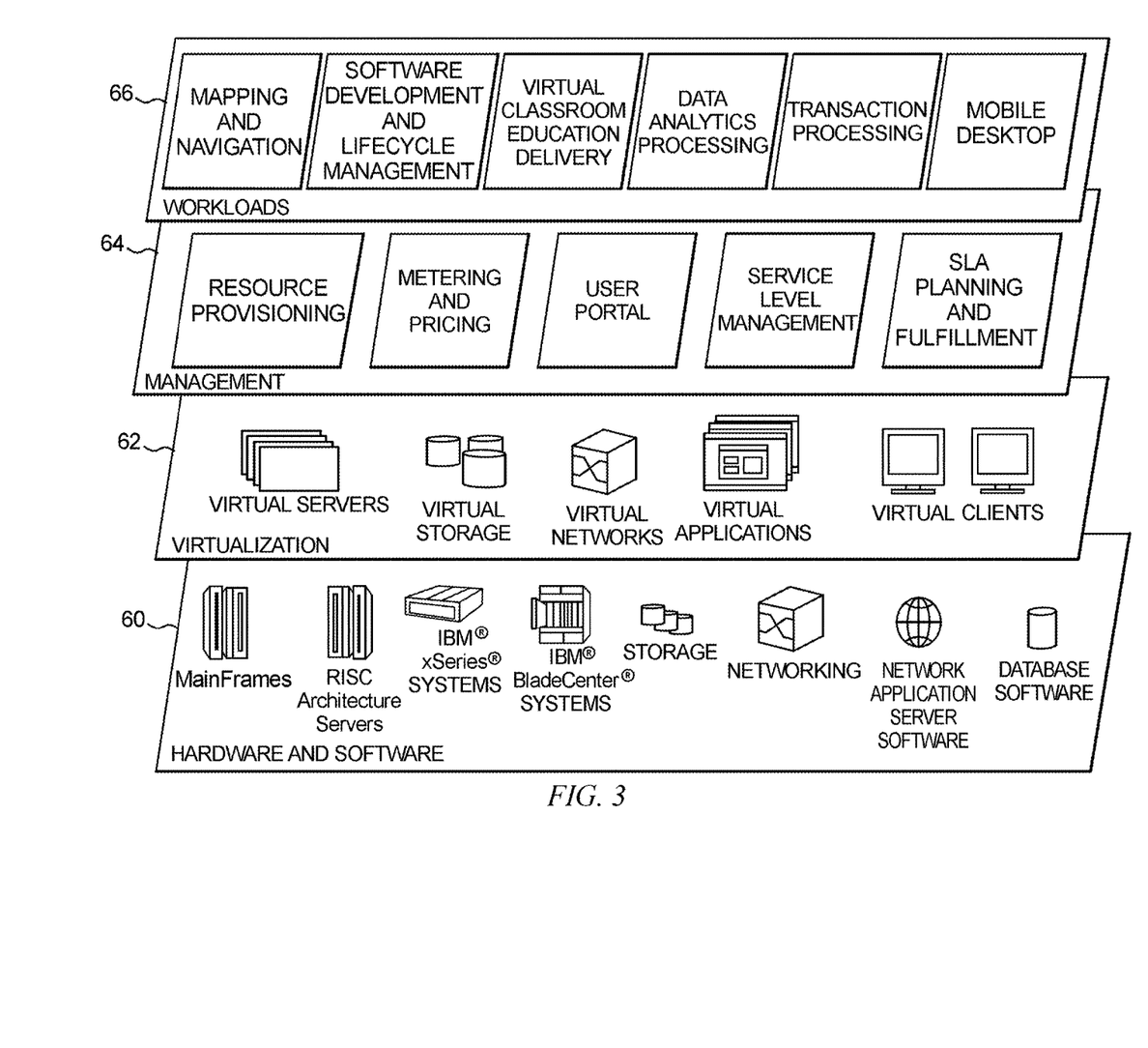
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Figure 4:
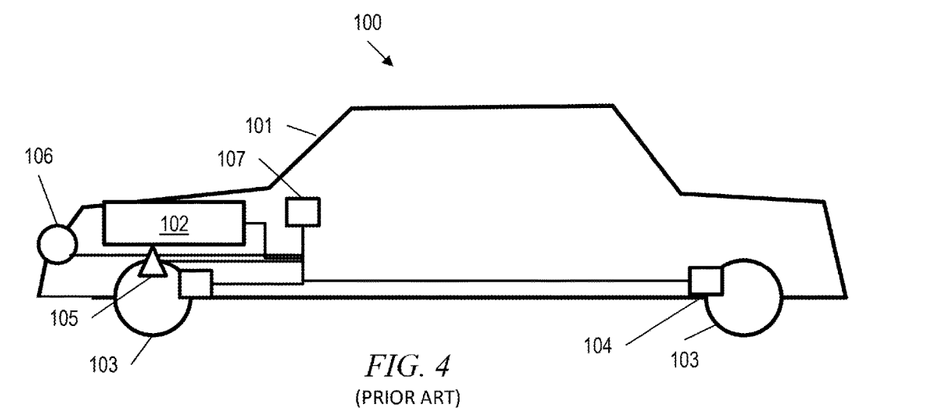
FIG. 4 illustrates a typical self-driving car.

Referring to FIG. 4, a self-driving car (SDC) 100 typically comprises a vehicle body 101, an engine or other powerplant (e.g., an electric motor) 102 that is mounted in the vehicle body, wheels 103 that are mounted on the vehicle body and driven by the powerplant either mechanically or electrically, brakes 104 that are mounted on the vehicle body for stopping the wheels, a steering apparatus 105 connected between the vehicle body and the wheels for steering the wheels, sensors 106 configured to detect environmental parameters (e.g., temperature, moisture, road edges, fixed obstacles, other vehicles, location, speed, and the like), specialized sensors including cameras (for object or obstacle detection and also for gesture recognition), light sensors, audio sensors, LIDAR, radar, ultrasonic, rear (back-up) cameras, vehicle proximity sensors, passenger weight sensors, etc and one or more processors 107 configured to control the engine, the wheels, the brakes, and the steering apparatus in response to information produced by the sensors and by a mapping module that is implemented in the processor. Typically. the processor facilitates the mapping module, which generates a route for the SDC to follow autonomously from its instant location to a programmed destination. However, like other modules discussed herein, the mapping module may be facilitated in a cloud computing environment as discussed above. For example, the SDC control modules, including the mapping module, may be implemented in cloud node processor 16. In any case, information provided by the mapping module to the processor includes, for example, a next turn direction and distance. The processor also may facilitate a parking module for autonomously parking the SDC when it reaches the programmed destination. Indeed, autonomous parking was one of the first milestones in SDC technology.

Despite being a leading aspect of SDC technology, autonomous parking still presents challenges with regard to road hazards, as discussed briefly above. In particular, conventional autonomous parking modules do not consider the path of a vehicle occupant disembarking from the vehicle, and may accordingly position a vehicle so that the occupant steps out directly into a road hazard.

Therefore, it is desirable to provide an SDC that can adjust its autonomous parking module to ameliorate a road hazard; in particular, to reduce a risk of a vehicle occupant disembarking into the road hazard.

As a first step in ameliorating a road hazard, the improved SDC identifies the road hazard using sensors that may be mounted on the SDC, or may be remote from the SDC. Exemplary vehicle-mounted sensor packages are described in A. L. Rankin et al., Daytime Mud Detection for Unmanned Ground Vehicle Autonomous Navigation (2008) (hereby incorporated by reference in its entirety for all purposes) and in K. Fujimura et al., Road Surface Sensor (1988) (hereby incorporated by reference in its entirety for all purposes). Rankin et al. also discuss exemplary remote sensor packages (see discussion of LandSat ground-imaging sensors). Generally, road hazards such as water, mud, ice, or snow can be distinguished from surrounding terrain and thereby identified, using polarization images; visible and infrared spectroscopy; and stereo ranging imagery, separately or in combination. Road hazards such as potholes, broken drains, and raised objects can be identified using radar; sonar; ultrasound; and visible or infrared imagery or stereo ranging imagery, separately or in combination.

Figure 5:
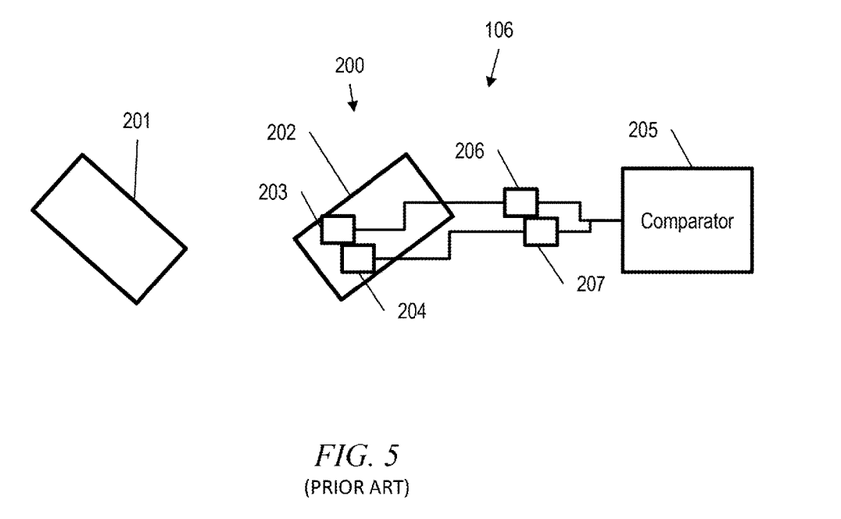
FIG. 5 depicts an exemplary polarization sensor.

FIG. 5 illustrates an exemplary polarization sensor 200 for identifying mud, puddles, snow, or ice based on road surface reflectance. The polarization sensor 200 includes a near-infrared light source unit 201 and a polarization camera 202, which includes a parallel polarizer 203 and a vertical polarizer 204. Each polarizer 203, 204 is connected in communication with a comparator 205 via a respective detector 206, 207. Using the comparator 205, the polarization sensor 200 outputs a ratio of parallel-polarized detections to vertically-polarized detections. This ratio then can be assessed to identify road surface conditions, as further discussed by Fujimura et al.

Figure 6:
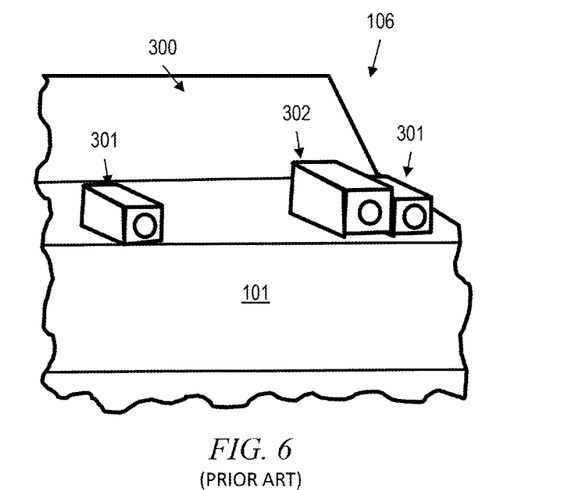
FIG. 6 depicts an exemplary stereo image and polarization sensor package.

FIG. 6 illustrates an exemplary stereo image and polarization sensor package 300. The sensor package 300 includes a stereo pair of color cameras 301 as well as a polarization camera 302. The stereo color cameras 301 produce overlapped color images, while the polarization camera 302 produces a polarization ratio image. The images from the three cameras can be fused to identify road surface conditions, as further discussed by Rankin et al.

Figure 7:
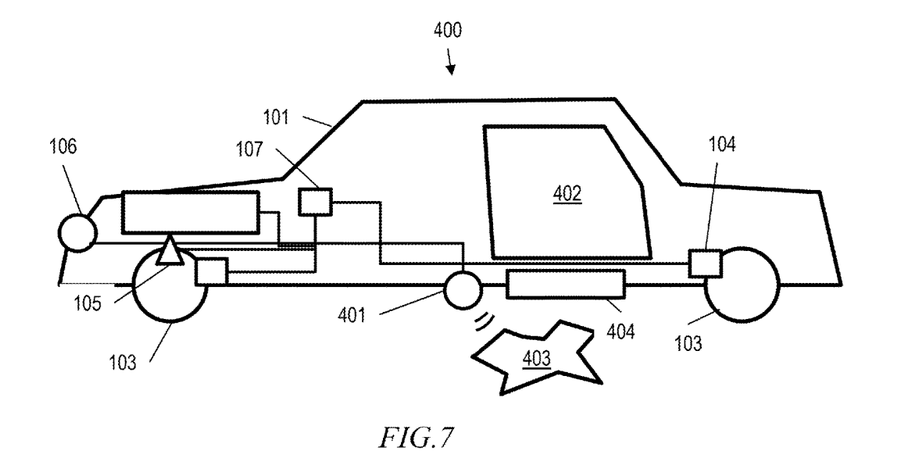
FIG. 7 depicts an improved self-driving car, according to an embodiment of the invention.

FIG. 7 illustrates an improved SDC 400, on which like numbers indicate like components to those shown and described with reference to FIG. 4. The improved SDC includes road hazard sensors 401 that are mounted on the SDC 400 adjacent a door 402 of the SDC. The road hazard sensors 401 are directed toward the ground near the SDC 400, and are connected in communication with the processor 107, which facilitates a road hazard identification package, further described below with reference to FIG. 8, in order to detect and identify a road hazard 403. In certain aspects, the self-driving car 400 incorporates a bridge or ramp 404, which is movably mounted near the door 402 for deployment to span the road hazard 403, as further discussed below.

Figure 8A:
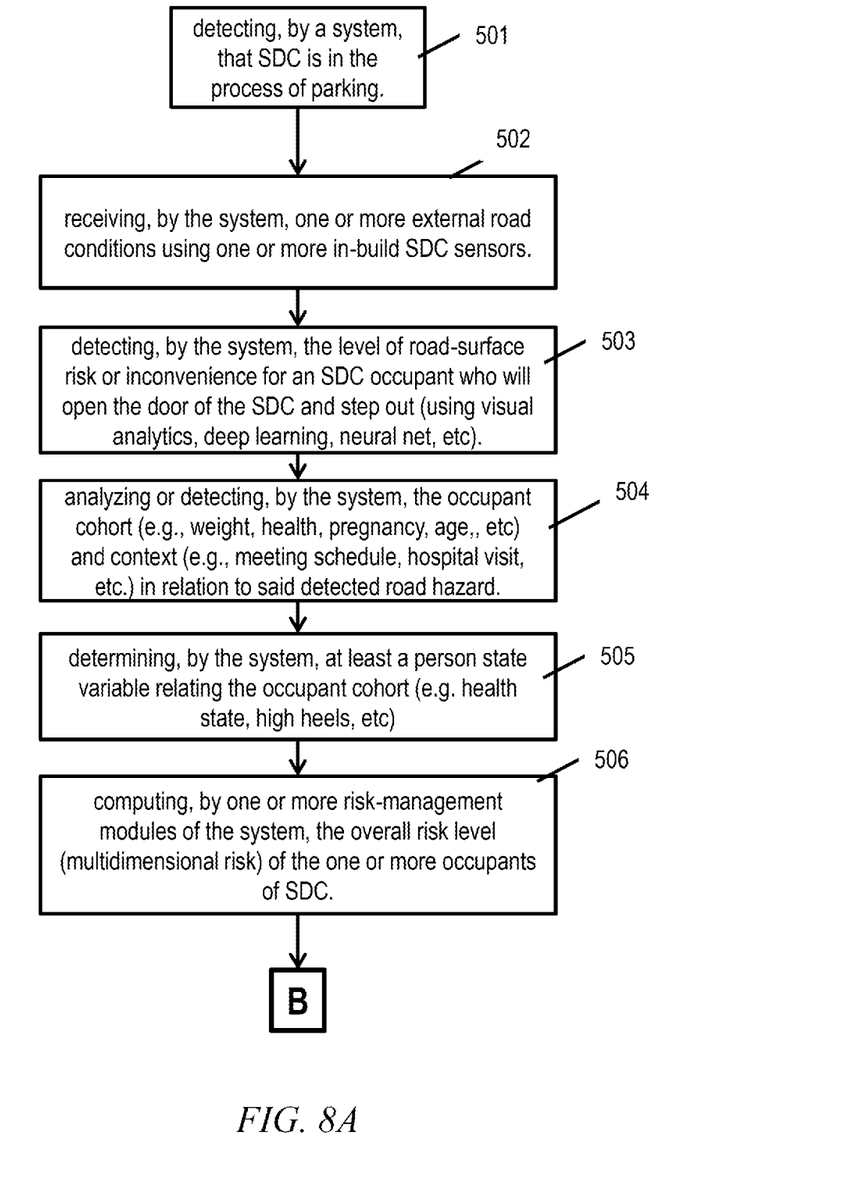
FIGS. 8A and 8B illustrates steps implemented in an exemplary road hazard identification package, according to an embodiment of the invention.
Figure 8B:
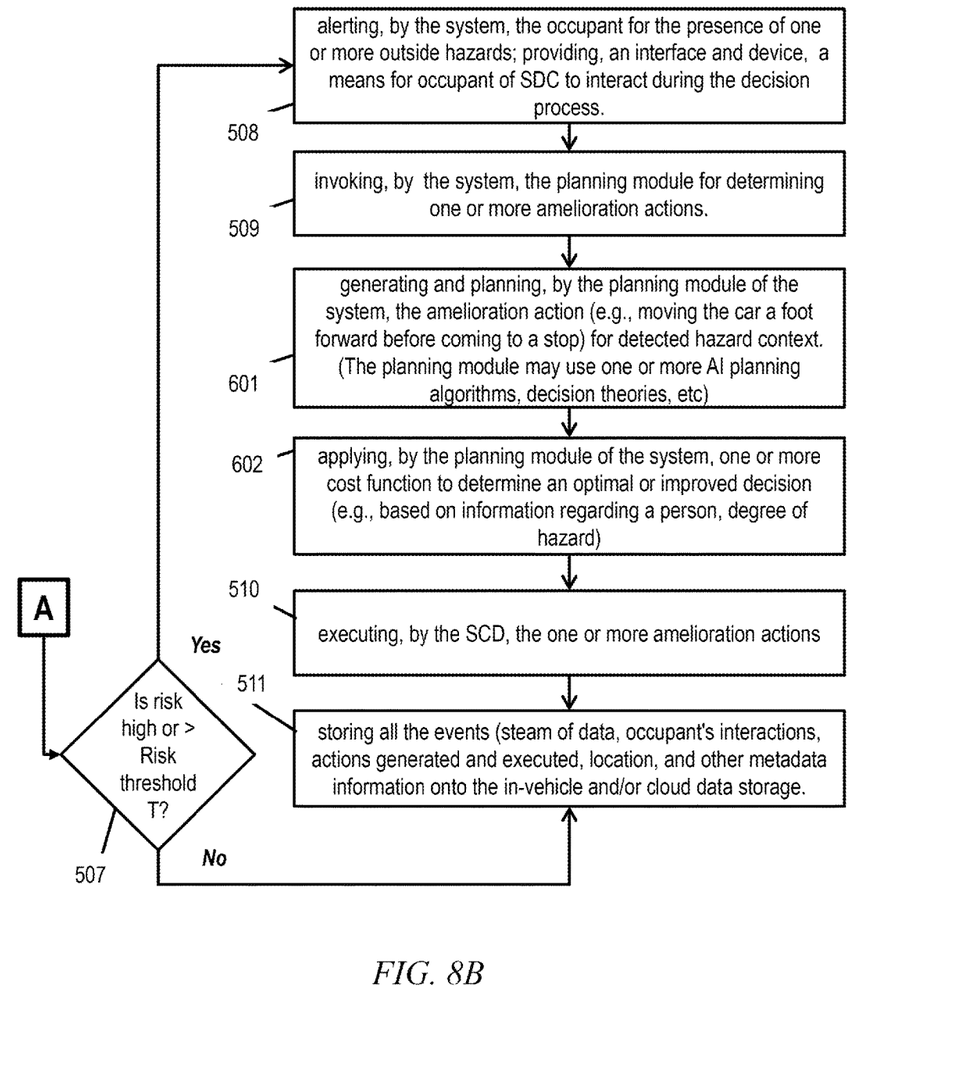

FIG. 8 illustrates steps implemented in an exemplary road hazard identification package or module ("RHIP") 500, which may be facilitated by the processor 107 or by remote (cloud) processing capabilities. The RHIP comprises of one or more hazard detection analytics models which are developed based on historical road hazards data. The road hazards data can be obtained from crowdsourcing reports, from satellite or aerial image data, from one or more online sources such as Google® image data, etc. The RHIP 500 first detects 501 that the SDC is in a parking mode. The RHIP 500 then receives 502 a stream of data (e.g., image data), corresponding to external road conditions, from one or more sensors 401. Next, the RHIP 500 uses the one or more analytics models to identify, detect and classify the received stream data belonging to one or more of the hazards models. Thus, the RHIP 500 detects 503 a level of road-surface risk or inconvenience for an SDC occupant who will open the door of the SDC and step out. For the step of detecting road-surface risk, the RHIP 500 may make use of visual analytics, deep learning, neural net, etc. The RHIP 500 also detects or analyzes 504 a vehicle occupant's "cohort" (e.g., weight range, health condition, pregnancy status, age range, etc.) and "context" (e.g., meeting schedule, hospital visit, etc.). The RHIP also determines 505 a person state variable (e.g., health state, apparel, etc.) relating to the vehicle occupant. Using one or more risk-management modules, the RHIP 500 computes 506 an overall risk level (multidimensional risk) related to the one or more occupants of the SDC. The risk assessment may be of any: (a) risk assessment based on the type and characteristics of external hazard detected, as well as contextual information (e.g., occupant(s)'s context); (b) determine the need for specialized emergency in-vehicle sensors or equipment to aid the occupant(s); (c) using video feed monitor the condition of the road hazard and send a signal for the SCD control unit for further actions, etc. Based on the multidimensional risk, the RHIP 500 assesses 507 whether the multidimensional risk exceeds a risk threshold T. If so, then the RHIP alerts 508 the vehicle occupant for the presence of one or more outside hazards; optionally, providing an interface and device, i.e. a means for occupant of SDC to interact during the decision process. Further, the RHIP 500 invokes 509 a planning module 600 for determining one or more amelioration actions.

The RHIP 500 provides to the planning module 600 a classification of the identified road hazard, e.g., as mud, ice, snow, puddle, broken drain, or the like, and also provides to the planning module a location of the road hazard 403, e.g., relative to the door 402. The stream of data received from the one or more sensors 401 will be used to improve the accuracy of the one or more machine learning models used for identification, detection or classification of one or more road hazards.

Figure 10:
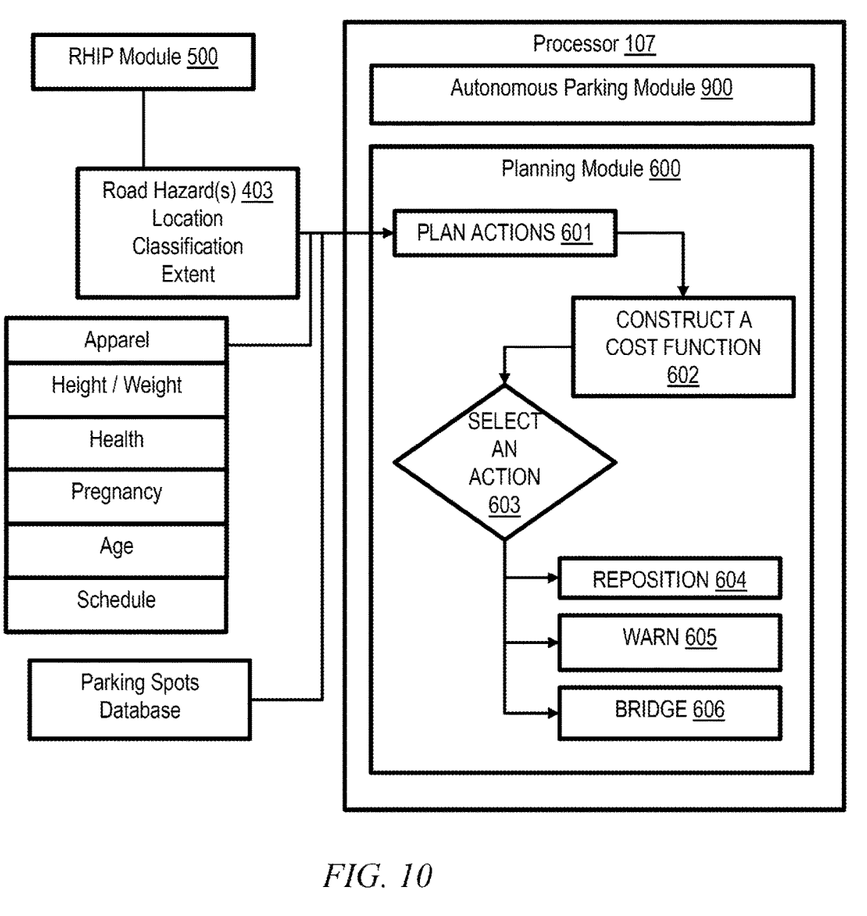
FIG. 10 illustrates a processor implementing steps of an improved autonomous parking module, according to an embodiment of the invention.

The planning module 600 is further illustrated in FIG. 10. Referring to FIG. 10, the processor 107 facilitates the RHIP 500 and the planning module 600 as part of an autonomous parking module 900. In response to the information provided from the RHIP 500, identifying a road hazard 403, the processor 107 constructs and applies 602 one or more cost function to determine an optimal or improved decision (e.g., based on information regarding a person, degree of hazard) for various actions to ameliorate the road hazard 403. Based on the output of the cost function, the processor 107 selects 603 an amelioration action (e.g., moving the car a foot forward before coming to a stop) for detected hazard context. (The planning module may use one or more AI planning algorithms, decision theories, etc.).

Factors of the cost function include location, classification, and extent of the road hazard 403 as well as parameters related to the vehicle occupant. For example, relevant vehicle occupant parameters may include any of the occupant's apparel, height, weight, health, pregnancy, age, schedule, or the like. Information on an occupant's apparel may be obtained from video or still-frame imagery or from RFID tags attached to items of apparel. Information on height and weight can be obtained from video imagery and from load sensors installed in the vehicle seats (e.g., similar to the sensors used for airbag activation and deactivation). Information on occupant health, pregnancy, or age may be obtained, for example, by non-invasive visual analytics (e.g., neural net, deep-learning algorithms, etc.), voice recognition, or self-configured by the occupant or group of occupants. Information on an occupant's schedule may be obtained from voice input, or by pairing with an occupant's mobile electronic devices to synchronize appointments data, by synchronizing an occupant's appointment data with the "cloud", or by synchronizing occupant's electronic calander. Furthermore, the cost function may take into account a user's capabilities and characteristics such as a disability or mobility challenge that may require amelioration. There may be multiple occupants in the vehicle, hence the cost function may optimize a process to allow each occupant to disembark while minimally interacting with the road hazard. The cost function also may account for external context—such as traffic density or weather conditions—when computing the actions to ameliorate the road hazard.

One can implement the cost function by customizing known multi-objective maximizing or minimizing optimization functions (e.g. evolutionary algorithms) as known in the prior art. Consider the cost function to be $f(\ )=Min(Risk((i)))$, where passenger(i) has a risk. Risk(i) is computed by a mathematical formula—an example of that is taking a weighted average of all the parameters. For example let the parameters and the weights be (<right rear door, w1=10>, <mud near door, w2=10>, <left front door pothole, w3=20>, <age of passengers >60, w4=15>). Weights represented w refers to the risk factor the passenger(s) may have. The weights may vary from passenger to passenger in the same car, and parameters may vary. The minimization function tries to find a minimum risk factor sometimes biased towards one or more passengers.

Figure 9:
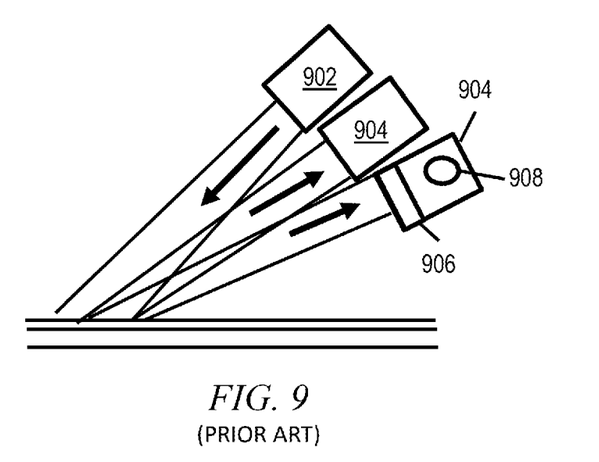
FIG. 9 depicts an exemplary spectroscopic water depth sensor.

Certain occupant parameters may obviate any need to ameliorate certain road hazards. For example, in case the road hazard is a mud puddle and a vehicle occupant is wearing rubber boots, the cost function may indicate no action required. Additionally, detailed analysis of a road hazard may reduce the calculated risk of the road hazard. For example, the depth of a puddle can be estimated using infrared or near-infrared light spectroscopy. Water has specific absorption properties in the near infrared spectrum. By shining a broad spectrum light source on the ground, then filtering the retro-reflected light for the near infrared range of wavelengths, it is possible to obtain a photodiode voltage that is directly related to puddle depth. Then shallower puddles can be given smaller weight in the cost function. FIG. 9 depicts an exemplary spectroscopic water depth detector 900, which includes a broad spectrum light source 902 and first and second receivers 904. Each receiver 904 has at its front end an IR filter 906, and houses a photodiode 908 that produces a voltage generally proportionate to the intensity of filtered light received at the photodiode. By normalizing the photodiode voltage to an intensity of light emitted by the broad spectrum source 902, it is possible to estimate puddle depth.

Referring back to FIG. 8, the RHIP 500 implements executing 510, by the SCD, the one or more amelioration actions selected by the planning module 600. Further, the RHIP stores 511 all the events (stream of data, occupant's interactions, actions generated and executed, location, and other metadata information) onto the in-vehicle and/or cloud data storage. These stored events are used to update the cost function algorithm according to known machine learning processes.

Thus, as shown and described with reference to FIGS. 8 and 9, AI planning technologies can be employed to model the action that the SDC can take and to perform context-aware compositions of ameliorating actions given the goal of the process, along with risk-management modules to estimate a risk for various scenarios. For example, in some cases, the SDC may incorporate an algorithm for maintaining a database of pothole locations and pothole characteristics. For example, the database may include a "history" of potholes in an area based on crowd sourced data. The RHIP 500 may acquire, fuse, and analyze pothole sensing data from several sources to identify possible dangers before opening the car door. In other cases, the SDC may be equipped with knowledge of parking spots with varying characteristics (e.g. reserved spots) to assist the planning module 600 in calculating 602 the cost function to select the amelioration action. SDCs may have cameras and sensors 401 to determine the condition of the "exit" places.

Referring again to FIG. 10, potential actions to ameliorate the road hazard 403 may include repositioning 604 the SDC (e.g., moving the SDC forward or backward; moving the SDC sideways) in order to offset the door 402 from the road hazard 403; issuing 605 a warning (e.g., an audio, visual, or tactile warning) to a vehicle occupant; or extending 606 a bridge or ramp from the SDC to bridge over the road hazard 403 from the door 402.

Thus, in review and summary, it will be appreciated that a method for parking a self-driving car 100 may comprise facilitating an autonomous parking module 900 of the self-driving car; and, facilitating a road hazard identification module 500 that scans the surroundings of the self-driving car, using at least one sensor 401 of the self-driving car, to identify a road hazard 403 proximate a door 402 of the self-driving car. Identifying the road hazard may include analyzing image data using a deep neural net. Scanning the surroundings may be done from outside the body of the self-driving car.

In certain aspects, in response to identifying the road hazard 403, the method includes ameliorating the road hazard in response to identifying the road hazard. Certain aspects of the method include the planning module 600 detecting at least one parameter of a vehicle occupant; and selecting 603 an action to ameliorate the road hazard, in response to the at least one parameter of the vehicle occupant. In certain aspects, the at least one parameter of the vehicle occupant may be detected through voice recognition.

In certain aspects, the at least one parameter of the vehicle occupant may include apparel of the vehicle occupant, which may be detected by receiving an RFID signal from the apparel of the vehicle occupant. Alternatively the occupant's apparel may be detected by image analysis. In certain aspects, the at least one parameter of the vehicle occupant may include health of the vehicle occupant. In certain aspects, the at least one parameter of the vehicle occupant may include pregnancy of the vehicle occupant. In certain aspects, the at least one parameter of the vehicle occupant may include a schedule of the vehicle occupant. The schedule may be determined, for example, by accessing an electronic calendar.

Ameliorating the road hazard may include adjusting 604 the autonomous parking module to reposition the car in order to offset the door of the car from the road hazard. Ameliorating the road hazard may include constructing 602 a cost function to identify an optimal ameliorating action. Ameliorating the road hazard may include issuing an audio, visual, or tactile warning 605 to a vehicle occupant.

In certain aspects, a self-driving car 400 comprises a vehicle body 101; wheels 103 that are mounted on the vehicle body for moving the car; brakes 104 that are mounted on the vehicle body for stopping the wheels; a steering apparatus 105 that is connected between the vehicle body and at least some of the wheels for steering the wheels; sensors 106 and 401 that are configured to detect environmental parameters; and a processor 107 that is configured to facilitate at least an autonomous parking module for controlling the wheels, brakes, and steering apparatus. The processor 107 is further configured to facilitate a road hazard identification module 500 that scans the surroundings of the self-driving car, using at least one of the sensors 401 (which may be disposed adjacent the door 402), in order to detect a road hazard 403 proximate a door 402 of the self-driving car 400. Additionally, the processor may be further configured to facilitate a planning module 600 for ameliorating the road hazard. Ameliorating the road hazard may include repositioning 604 the car to offset the door of the car from the road hazard. In certain aspects, ameliorating the road hazard may include issuing a warning 605 to a vehicle occupant. In some embodiments, the self-driving car may include a bridge or ramp 404 that is mounted adjacent the door 402 of the car, and ameliorating the road hazard 403 may include activating 606 the bridge or ramp to span the road hazard from the door of the car.

Other aspects provide a non-transitory computer readable medium that comprises computer executable instructions which when executed by a computer cause the computer to facilitate the method of: facilitating an autonomous parking module 900 of a self-driving car 400; and facilitating a road hazard identification module 500 that scans the surroundings of the self-driving car, using at least one sensor 401 of the self-driving car 400, to identify a road hazard 403 proximate a door 402 of the self-driving car.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 1, such an implementation might employ, for example, the processor 16, the memory 28, and an input/output interface formed, for example, by a display 24 and other external devices (such as a keyboard and mouse) 14. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 16, memory 28, and input/output interface such as display 24 and external devices 14 can be interconnected, for example, via bus 18 as part of a data processing unit 12. Suitable interconnections, for example via bus 18, can also be provided to a network interface 20, such as a network card, which can be provided to interface with a computer network, and to a storage system 34, such as a diskette or CD-ROM drive, which can be provided to interface with computer readable storage media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1008, displays 24, pointing devices, and the like) can be coupled to the system either directly (such as via bus 18) or through intervening I/O controllers (omitted for clarity).

Network adapters such as network interface 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 10) running a server program. It will be understood that such a physical server may or may not include a di splay and keyboard.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, an autonomous parking module 900, a road hazard identification module 500, and an amelioration action planning module 600. The method steps can then be carried out using the distinct software modules and/or sub-modules of the system, as described above, executing on one or more hardware processors 16. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The above-described embodiments are intended to be illustrative only. Other embodiments may, for example, utilize different materials and processing steps from those expressly set forth above to achieve embodiments falling within the scope of the present disclosure. These many alternative embodiments will be apparent to one having ordinary skill in the relevant arts.

All the features disclosed herein may be replaced by alternative features serving the same, equivalent, or similar purposes, unless expressly stated otherwise. Thus, unless expressly stated otherwise, each feature disclosed is one example only of a generic series of equivale The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Terms such as "above" and "below" are used to indicate relative positioning of elements or structures to each other as opposed to relative elevation. It should also be noted that, in some alternative implementations, the steps of the exemplary methods may occur out of the order noted in the figures. For example, two steps shown in succession may, in fact, be executed substantially concurrently, or certain steps may sometimes be executed in the reverse order, depending upon the functionality involved.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Any element in a claim that does not explicitly state "means for" performing a specified function or "step for" performing a specified function is not to be interpreted as a "means for" or "step for" clause as specified in AIA 35 U.S.C. § 112(f). In particular, the use of "steps of" in the claims herein is not intended to invoke the provisions of AIA 35 U.S.C. § 112(f).

What is claimed is:

1. A method comprising:
    facilitating an autonomous parking module of a self-driving car;
    facilitating a road hazard identification module that scans the surroundings of the self-driving car, using at least one sensor of the self-driving car, to identify a road hazard proximate a door of the self-driving car; and
    ameliorating the road hazard by adjusting the autonomous parking module to reposition the self-driving car in order to offset the door of the self-driving car from the road hazard.

2. The method of claim 1 wherein ameliorating the road hazard further comprises:
    facilitating a planning module that detects at least one parameter of a vehicle occupant; and selecting an action to ameliorate the road hazard, in response to the at least one parameter of the vehicle occupant.

3. The method of claim 2 wherein the at least one parameter of the vehicle occupant includes apparel of the vehicle occupant.

4. The method of claim 3 further comprising receiving an RFID signal from the apparel of the vehicle occupant.

5. The method of claim 2 wherein the at least one parameter of the vehicle occupant includes health of the vehicle occupant.

6. The method of claim 2 wherein the at least one parameter of the vehicle occupant includes pregnancy of the vehicle occupant.

7. The method of claim 2 wherein the at least one parameter of the vehicle occupant includes a schedule of the vehicle occupant.

8. The method of claim 7 further comprising determining the schedule by accessing an electronic calendar.

9. The method of claim 2 wherein the at least one parameter of the vehicle occupant is detected through voice recognition.

10. The method of claim 1 wherein ameliorating the road hazard further includes constructing a cost function to identify an optimal ameliorating action.

11. The method of claim 1 wherein ameliorating the road hazard further includes issuing an audio, visual, or tactile warning to a vehicle occupant.

12. The method of claim 1 wherein identifying the road hazard includes analyzing image data using a deep neural net.

13. The method of claim 1 wherein scanning the surroundings is done from outside the body of the self-driving car.

14. A self-driving car comprising:
a vehicle body;
wheels mounted on the vehicle body for moving the car;
brakes mounted on the vehicle body for stopping the wheels;
a steering apparatus connected between the vehicle body and at least some of the wheels for steering the wheels;
sensors configured to detect environmental parameters; and
a processor that is configured to facilitate at least an autonomous parking module for controlling the wheels, brakes, and steering apparatus,
wherein the processor is further configured to facilitate a road hazard identification module that scans the surroundings of the self-driving car, using at least one of the sensors, in order to detect a road hazard proximate a door of the self-driving car, and to facilitate a planning module for ameliorating the road hazard, wherein ameliorating the road hazard includes repositioning the self-driving car to offset the door of the self-driving car from the road hazard.

15. The self-driving car of claim 14 wherein ameliorating the road hazard includes issuing a warning to a vehicle occupant.

16. The self-driving car of claim 14, wherein at least one of the sensors is disposed adjacent a door of the car.

17. A self-driving car comprising:
a vehicle body;
wheels mounted on the vehicle body for moving the car;
brakes mounted on the vehicle body for stopping the wheels;
a steering apparatus connected between the vehicle body and at least some of the wheels for steering the wheels;
sensors configured to detect environmental parameters;
a bridge or ramp mounted adjacent a door of the self-driving car; and
a processor that is configured to facilitate at least an autonomous parking module for controlling the wheels, brakes, and steering apparatus,
wherein the processor is further configured to facilitate a road hazard identification module that scans the surroundings of the self-driving car, using at least one of the sensors, in order to detect a road hazard proximate the door of the self-driving car, and to facilitate a planning module for ameliorating the road hazard, wherein ameliorating the road hazard includes activating the bridge or ramp to span the road hazard from the door of the car.

18. A computer readable storage medium comprising computer executable instructions which when executed by a computer cause the computer to:
facilitate an autonomous parking module of a self-driving car;
facilitate a road hazard identification module that scans the surroundings of the self-driving car, using at least one sensor of the self-driving car, to identify a road hazard proximate a door of the self-driving car; and
facilitate ameliorating the road hazard by adjusting the autonomous parking module to reposition the self-driving car in order to offset the door of the self-driving car from the road hazard.

* * * * *